SELECTION OF LOW INTERFERENCE RADIO CHANNELS

Filed Nov. 24, 1951 4 Sheets-Sheet 1

INVENTORS: G. W. GILMAN
K. W. PFLEGER

BY H. A. Burgess
ATTORNEY

Nov. 9, 1954 G. W. GILMAN ET AL 2,694,140

SELECTION OF LOW INTERFERENCE RADIO CHANNELS

Filed Nov. 24, 1951 4 Sheets-Sheet 2

INVENTORS: G. W. GILMAN
K. W. PFLEGER

BY H. A. Burgess
ATTORNEY

INVENTORS: G. W. GILMAN
K. W. PFLEGER
BY H. A. Burgess
ATTORNEY

INVENTORS: G. W. GILMAN
K. W. PFLEGER
BY H. A. Burgess
ATTORNEY

United States Patent Office 2,694,140

Patented Nov. 9, 1954

2,694,140

SELECTION OF LOW INTERFERENCE RADIO CHANNELS

George W. Gilman, Summit, and Kenneth W. Pfleger, Arlington, N. J., assignors to Bell Telephone Laboratories, Incorporated, New York, N. Y., a corporation of New York Application November 24, 1951, Serial No. 258,034

8 Claims. (Cl. 250—6)

The present invention relates to radio transmission that is subject to jamming or other serious interference, and provides ways of combatting such interference. The interference may arise from frequency congestion in a given area such as in overseas communication or from intentional jamming of certain channels or from other causes.

An object of the invention is to facilitate substitution of a more usable available channel for a channel that has deteriorated during transmission.

A further object of the invention is to scan a frequency band continuously to locate an available channel which may be substituted for the one that is in use.

A further object is to scan a frequency band continuously and upon locating an available frequency space to transfer transmission to such space.

Other objects and features of the invention will appear more fully from the detail description to follow.

It has been known in the past to distribute a message such as speech in short segments over a plurality of transmission paths between a transmitting terminal and a distant receiving terminal in order to make maximum use of these paths where fewer paths exist than the messages to be sent at the same time. Such systems aim to take advantage of pauses between sentences, words or syllables to fill up the transmission time of each path to the maximum.

It has also been known in the past in setting up a communication between a radio transmitter and distant receiver to scan the frequency region assigned to such stations to find an unused band and to initiate and continue the communication over the selected band to the end of the communication, whereupon the band is released for use by the same or another station for another call.

In accordance with one form of the present invention, if communication has begun over a given channel and if subsequently this channel deteriorates due to interference to the point where it is unusable or less usable than another available channel, means are provided for substituting the more usable channel for the one that has deterioraed. The substitution can be made on different bases. In one form the substitution is made as soon as another available channel has been located. In this case the channels to which the given stations have access are continually scanned for unused frequency space. In another form the scanning devices are operative constantly to search out an available frequency space but transfer to such space is not made so long as transmission over the channel in use remains satisfactory.

The nature of the invention and its various objects and features will be more clearly understood from the following detail description taken in connection with the accompanying drawings in which:

Fig. 1 is an over-all diagram and block schematic of a two-terminal radio channel embodying the invention in one form;

Figs. 2A and 2B when placed together with Fig. 2A at the left show a schematic circuit diagram of the search receiver and automatic frequency control devices assumed to be used in the system of Fig. 1;

Figure 1:
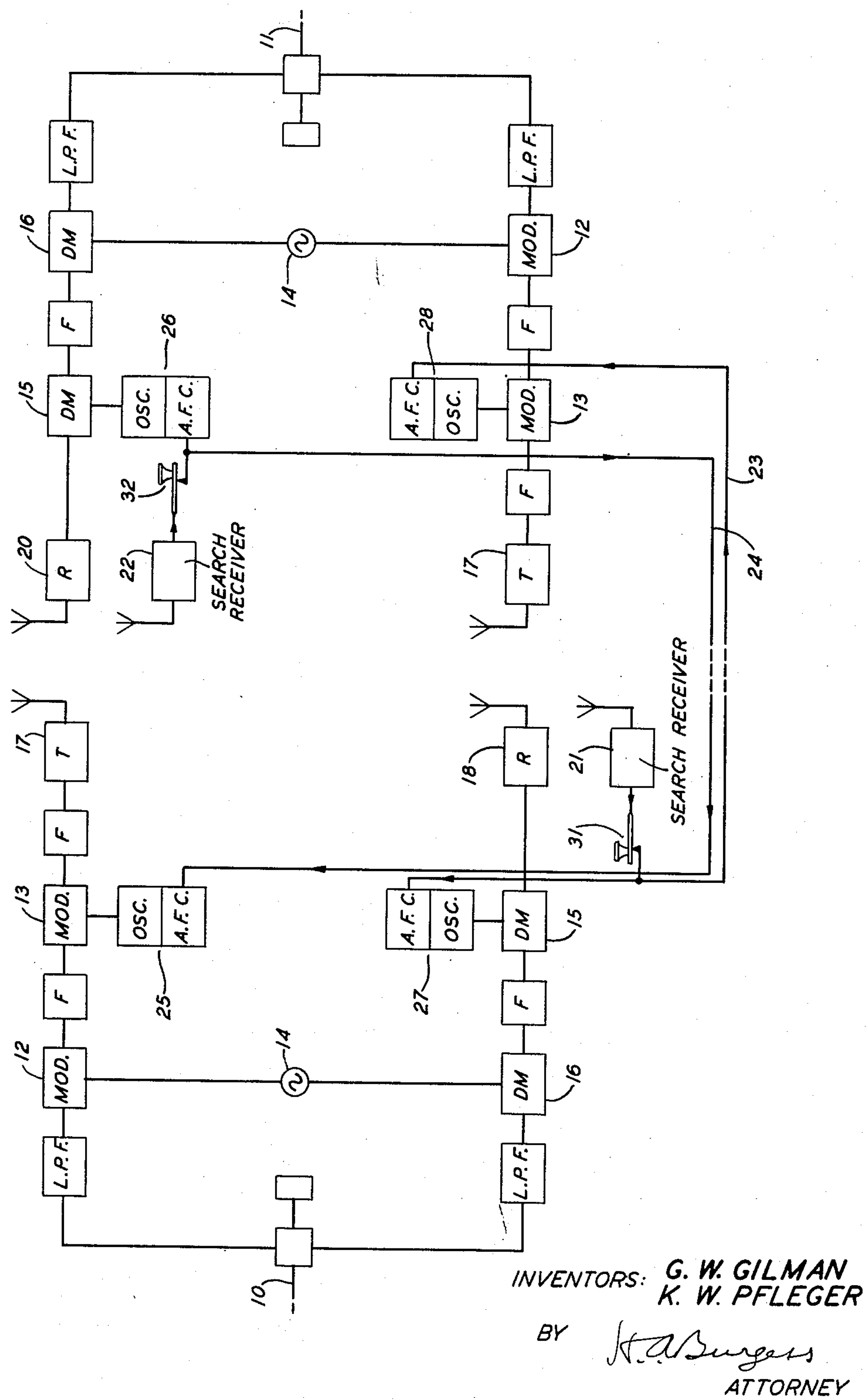

In Fig. 1, telephone lines 10 and 11 at the extreme left and right-hand sides of the figure are shown connected each to a two-way radio terminal, considered to be at opposite ends of a given radio channel and adapted for communication with each other. The apparatus shown for the transmitting and receiving sides of each radio station is quite conventional and includes double detection and double modulation as is common in the art. Reading from the telephone line toward the radio equipment, the first stage modulator is shown at 12, supplied with intermediate frequency waves from source 14, and the second stage modulator is shown at 13. The latter modulator is shown as supplied with carrier waves which are capable of adjustment as to frequency, the oscillator 25 or 28 having an automatic frequency control (AFC) associated with it for this purpose. Both modulators may be of the balanced or carrier-suppression type, and suitable filters are shown for selecting single or double side bands for transmission. The radio transmitter T itself shown at 17 may be quite conventional.

On the receiving side proceeding from the radio receiver 18 toward the telephone line there is a first stage demodulator 15 supplied with waves of adjustable frequency from source 26 or 27; and a second stage demodulator 16 supplied with intermedaite frequency waves from source 14.

Associated with each radio terminal in accordance with this invention is a search receiver 21 or 22 for scanning the ether bands to select for subsequent use by the system, a frequency band which is not being used by another station, and which is suitably free from interference. The search receiver 21 is shown as controlling the tuning of its own receiver and of the distant transmitter over the line 23, by means of the automatic frequency controls at 27 and 28 respectively. In similar manner the opposite station is provided with search receiver 22 for exercising similar control (over line 24) of the tuning of its local receiver and distant transmitter by controlling the AFC at 26 and at 25, respectively.

The manners in which the controls of the frequency are exercised can vary according to need or preference. For example, the search receiver will be assumed to be continuously active to search for idle frequency bands and to send identifying indications of each band to its own receiver and to the distant transmitter. According to one method of operation, as soon as such an idle channel has been located, the transmission will be shifted instantly from the channel in use to the newly found channel. According to this method of operation, the transmission would be shifted frequently from one to another of several channels. Disturbances in transmission due to jamming of any given channel or to the incidence of severe interference from other causes, would be avoided due to the fact that the shifts are made frequently and always to a channel which exhibits but little or no interference.

In accordance with a somewhat different mode of operation a shift from the existing channel to another available channel would be made only at the will of the talker or operator, as for example, when the transmission in the existing channel deteriorates to an objectionable degree. In this case the search receiver is continually searching to locate available channels, but no shift to another channel is made until the key shown at 31 or 32 is opened for a brief interval. In the latter case, transmission would be allowed to continue over an existing channel so long as it is satisfactory, but if the interference becomes too great, the attendant at the radio terminal may, by operation of key 31 or 32, shift to another channel which in each case has already been preselected by operation of search receiver 21 or 22 as the case may be. If it is desired to have the talker control the shift, the contact referred to as key 31 or 32 could instead be a relay contact operated over an auxiliary circuit from the point at which the talker is located, and the key would be provided at the latter point.

The information sent by the search receiver to the AFC of its own receiver, and the AFC of the distant transmitter could be in any one of several forms, but in accordance with the detail disclosure to follow this information is in the form of code pulses similar to those used in printing telegraphy. One advantage of using direct-current pulses or low frequency signals for this purpose is that these may readily be transmitted over telegraph land lines or submarine cables, or through a narrow frequency band superposed on an existing communication channel over either lines or radio links.

In the detailed embodiment to be described more fully hereinafter, provision is made for selection among sixteen channels in each direction of transmission, this number being illustrative and by way of example. For the selection of these sixteen channels, a four-pulse code is required. Permutations of these four pulses are sent under control of the search receivers to identify the channels one after another. When an idle channel is encountered by the search receiver, absence of received energy in this channel results in the transmission of an actuating pulse in the fifth code interval. Receipt of this pulse at the local AFC and at the distant AFC causes a shift in the operating channel frequency to that corersponding to the channel which has been identified by the four-pulse code permutation immediately preceding the fifth or actuating pulse. When a busy channel or one containing severe interference is encountered, the four-pulse permutation identifying such channel is transmitted as before, but the presence of radio energy in this channel prevents the sending of the fifth or actuating pulse so that no shift in tuning by the signaling channel is made in this case.

Figure 2A:
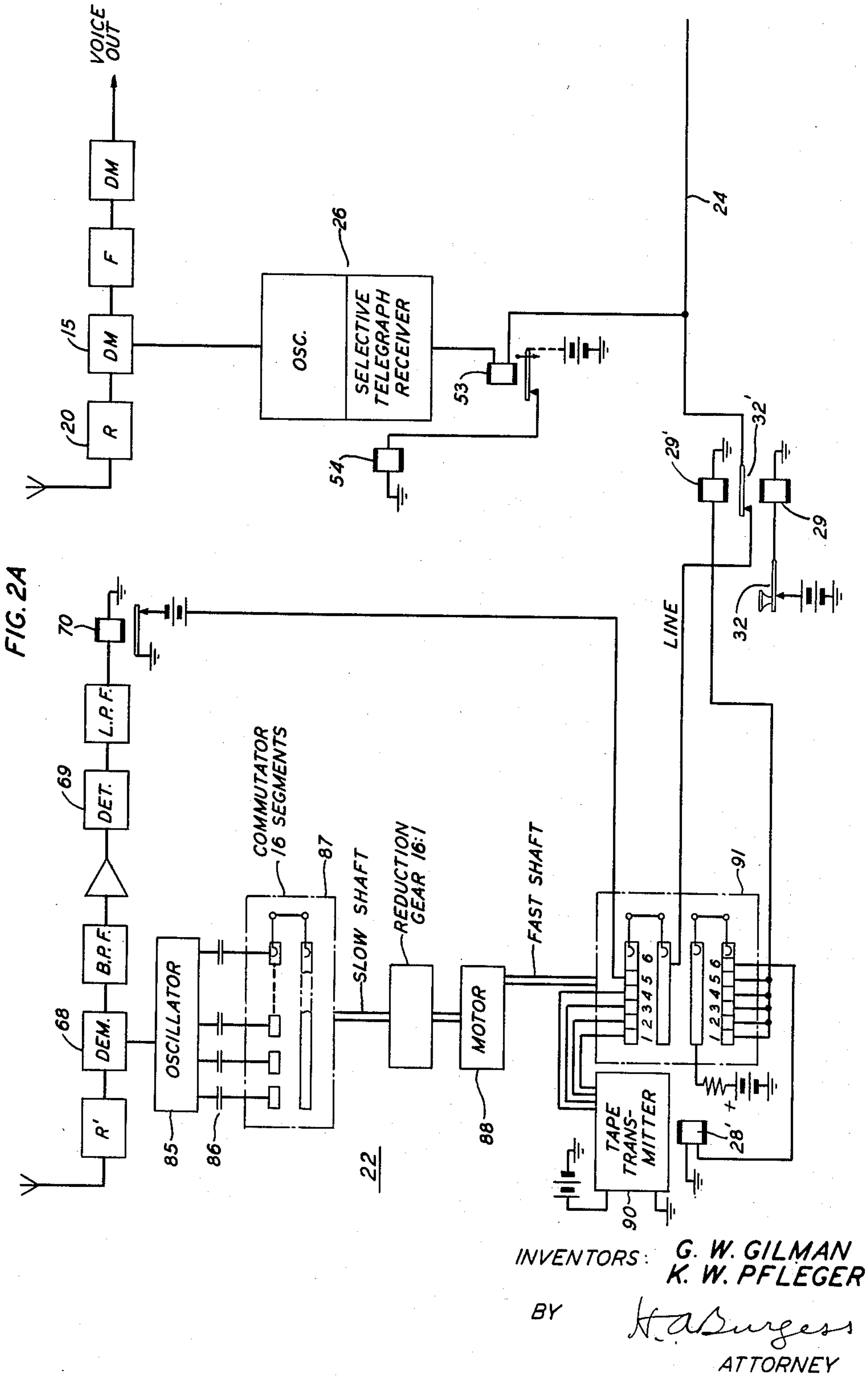

Reference will now be made to Fig. 2 for a more detailed description of the operation of the search receiver. This is diagrammed as having its own antenna and receiver R′ (Fig. 2A) followed by a first demodulator 68, second detector 69 and a carrier operated relay 70. Demodulator 68 is supplied with beating oscillations from oscillator 85 which has associated with it sixteen capacities shown at 86, each of which when switched into circuit by the commutator 87, tunes the oscillator to correspond to a different one of the sixteen channels of the system. Commutator 87 has its brush driven from motor 88 so that the search receiver is by this means successively tuned to each of the sixteen channels and this operation is repeated continuously.

The motor 88 also controls the operation of a tape transmitter 90 for sending code permutations corresponding to each different tuning of the oscillator 85. This tape transmitter is not shown in detail but may be constructed in accordance with the disclosure of United States patent to Benjamin 1,298,440 patented March 25, 1919. An endless tape is punched according to all of the permutations of a four-element code and is arranged to bring a new role of holes into transmitting position under control of stepping magnet 28′, each time the search receiver is tuned to a new channel. The brushes of commutators indicated at 91 make a complete revolution for each position of the tape. Segments 1 to 4, inclusive, of the upper ring have electrical potentials in accordance with the signal punched in the row of holes of the tape, engaged by the contact fingers of the Benjamin disclosure. After the brush has swept over the first five segments of this commutator the tape takes another step to present another row of holes. The commutator 91 is shown as being driven by the motor 88 having a turns ratio of 16 to 1 with respect to the shaft driving the commutator 87. Stepping magnet 28′ is actuated from the lower brush of commutator 91 after five segments of the upper ring have been swept over. The upper brush in traveling over the first four segments of the upper ring, transmits one or more pulses to line 24, depending upon the punching of the tape. During the fifth interval an additional or actuating pulse is transmitted to line 24 if relay 70 is released at this time, meaning that the channel on which the search receiver is set is not receiving radio frequency energy. If radio energy is being received in the channel to which the search receiver is tuned, relay 70 is energized and prevents transmission of a fifth pulse from battery through the rest contact of the relay and the fifth commutator segment. While the Benjamin patent shows the contacts of the tape transmitter arranged to send plus and minus pulses, the showing of the tape transmitter 90 has been simplified to the extent of showing ground for one of these sources and battery for the other source, so that the pulses in the present instance would consist of plus voltage for marks and zero voltage for spaces.

In this figure the key 32 is shown not directly in the line 24 as in the previous figure but as operating through the intermediary of relay 29 and its armature 32′ to open or close line 24. A second magnet 29′ acting on the same armature 32′ is provided for the purpose of preventing the transmission of a false signal on reclosure of key 32 in a manner that will be described at a later point.

The pulses transmitted over the line 24 are led to the local AFC at 26 for tuning the signal receiver and to the distant AFC at 25 (Fig. 2B) for tuning the distant transmitter. Only the AFC at 25 is shown in detail, both of these being essentially similar.

The AFC at 25 (Fig. 2B) includes the selective mechanism 50 of a printing telegraph receiver of the type shown, for example, in Krum Patent 1,665,594, April 10, 1928, modified slightly to accommodate a four-element code instead of a five-element code. For this purpose there are but four permutation code bars 42 corresponding to those of the Krum patent and sixteen actuating bars 40, similar to those of Krum. In this instance however, the actuating bars instead of operating type bars for printing purposes merely serve to cause closure of contacts 51 (Figs. 2B and 3) each of which connects an individual tuning condenser 52 into circuit with the oscillator 25′ by connecting one terminal of the condenser to ground. When the permutation bars 42 are actuated to make a selection, the right-hand end of one and only one actuating bar 40 is allowed to move upwards in Fig. 3 into an aligned row of slots in the bars 42, under tension of spring 41. To allow this to occur, the bail 47 is mechanically raised to free the right-hand end of each of the bars 40. Immediately following the raising of the selected bar 40, the member 48 is mechanically moved to engage the uplifted bar and move it to the left in Fig. 3. This motion is imparted to one of the sixteen rods 58 mounted in frame 64 for endwise movement. The left end of each rod 58 is covered with insulating material mechanically in contact with one of the springs of a switch 51, so that if a rod 58 is pushed toward the left, the two contact springs of corresponding switch 51 are brought into engagement. A locking lug 62 is provided on the underside of each rod 58 and engages bail 61 when the rod is in its actuated position towards the left. By this means each rod is held to its actuated position. When the next selection is made however, the sloping cam surfaces on lug 62 and bail 61 cause release of the previously actuated bar, which is pulled under tension of restoring spring 59 until stop 63 engages the frame member 64. The bail 61 is held in its uppermost position by spring 60. (A magnet 54 is provided for releasing any actuated bar 58 in accordance with a modification to be described later.)

The receiving distributor is shown as comprising two pairs of rings 92 and 93. The incoming line 24 is connected to the solid ring of receiving distributor 93 and as the brush travels across this ring it connects the line successively to the four selector magnets 75 (these being the selector magnets 75 of the Krum patent) to move the selector bars 42 to make a character selection. In the Krum patent, a five-element code is used to make the selection and a sixth pulse is sent over the line to energize the operating magnet 76. In the present disclosure, the operating magnet 76 is energized from commutator 92 during the fifth pulse interval.

Whenever there is a marking pulse on line 24 in the fifth pulse interval, line current from the No. 5 segment of commutator 93 flows through the left-hand winding of relay 86 which attracts both of its armatures. The right-hand armature of relay 86 closes a locking circuit through the right-hand winding of the relay in series with normal contact springs 89. The left-hand armature applies ground to the winding of shift magnet 85 which attracts its armature and raises the frame 64 about its pivot 98 to bring the right-hand ends of the rods 58 into registering alignment with the actuating bars 40. When the selected actuating bar 40 is moved to the left, therefore, it engages the corresponding rod 58 and moves it to the left so as to close contact 51 as already described. Springs 89 are opened by the operation of the selected actuating bar 40, when it reaches a point near the extremity of its motion, by lug 87′ engaging transverse bar 88′ which extends across all of the bars 40 and is engageable by any one of the lugs 87′. Movement of the bar 88′ opens the contacts 89 and restores relay 86, and in turn magnet 85, to normal.

If in the next or any subsequent signaling interval a space is received on line 24, during the fifth pulse interval, relay 86 remains unenergized and the frame 64 remains in its lower position against stop 94. In this position, the rods 58 are slightly out of alignment with the bars 40 so that when any one of the bars 40 is selected and moved toward the left, it does not engage a rod 58.

Figures 2B, 4, 5:
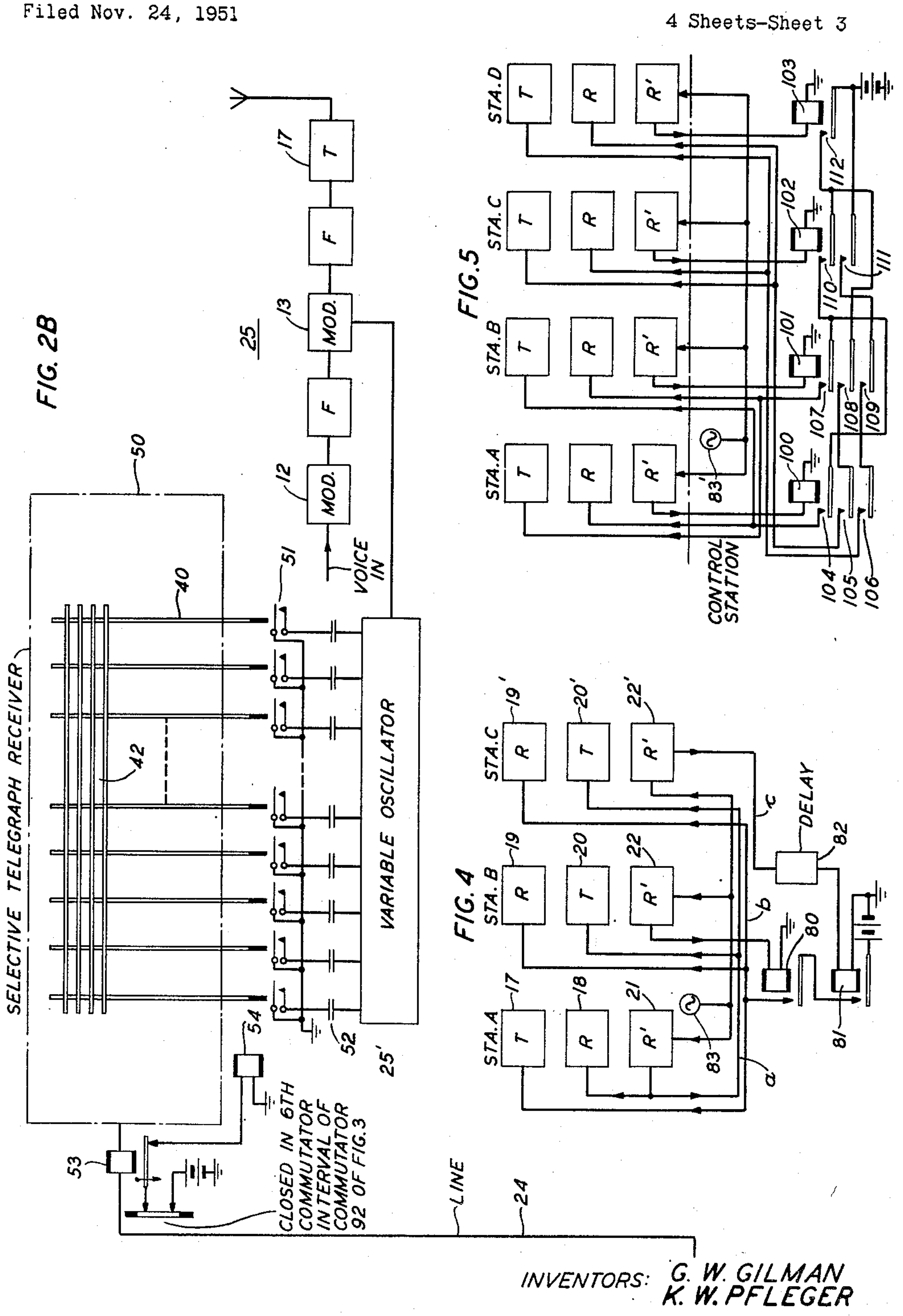
Fig. 4 is a simplified diagram in block schematic of a system embodying more than three terminals and including a lock-out feature in accordance with the invention.
Fig. 5 is a simplified diagram in block schematic of a multi-terminal system including extended use of the lock-out feature in accordance with the invention.
Figures 3, 3A:
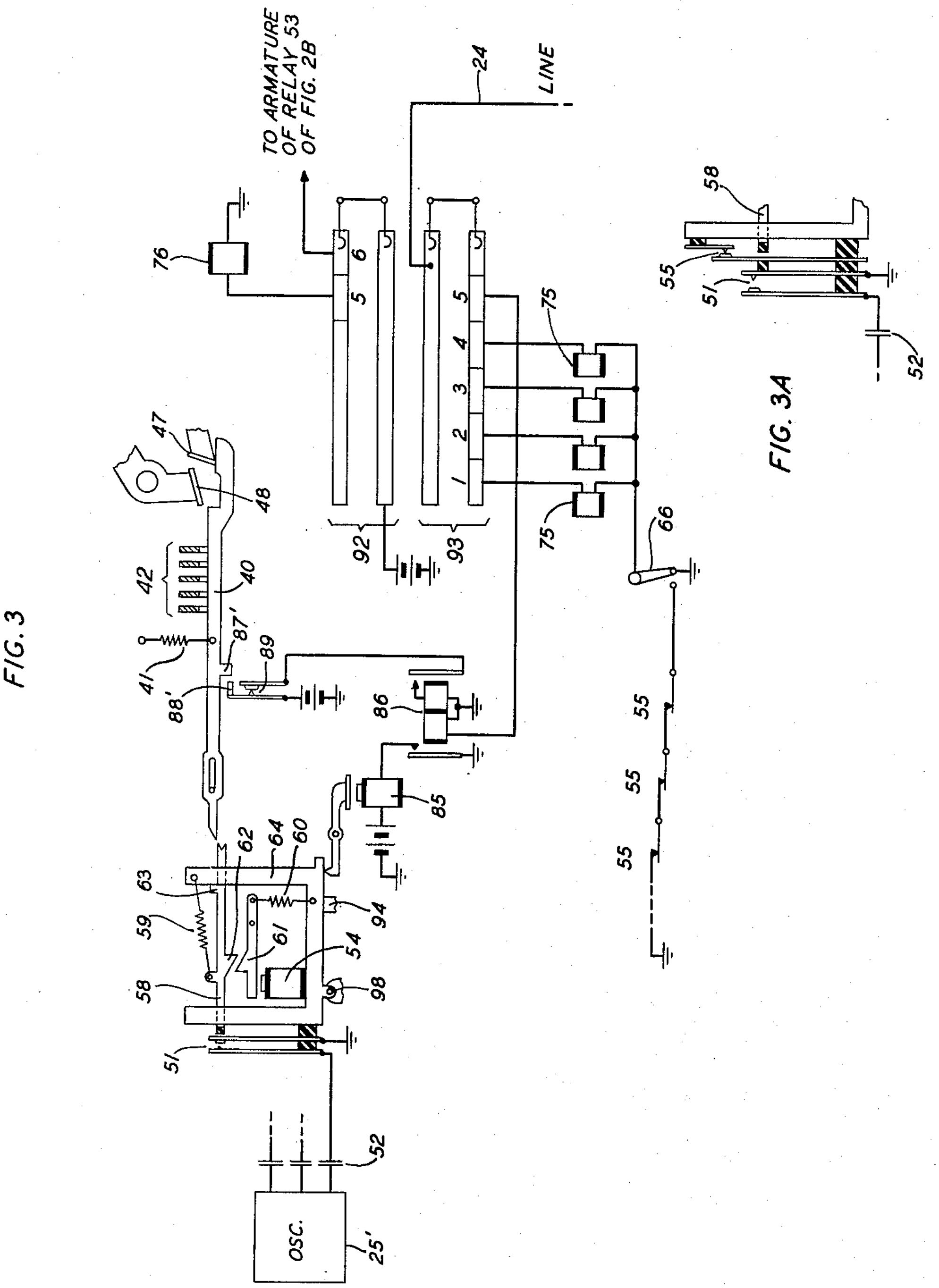
Fig. 3 is a mechanical detail of a part of the automatic frequency control selector device.
Fig. 3A is a fragmentary view showing alternative details of the automatic frequency selecting mechanism.

To condition the circuit for the alternative method of operation in which the transfer to a new channel is not made until the talker or operator opens the key 31 or 32, the switch 66 in Fig. 3 is moved to its left or alternate position. The search for idle channels proceeds as already described, but switching to a new channel is prevented under control of the extra pairs of contacts 55 indicated in Figs. 3 and 3A. The four selecting magnets 75 are shown as each having a terminal leading to a segment of the receiving distributor and as having a common return which extends through switch 66 in its normal position to ground. When switch 66 is thrown to its alternate position, however, the common ground return for the selecting magnets is carried in series through the sixteen contacts 55, one for each of the rods 58 of Fig. 3. As soon as any channel is selected and the corresponding rod 58 is moved to the left in Fig. 3 to tune the oscillator 25′, as previously described, the corresponding switch contact 55 is opened, and it is impossible to make another selection until such contact is closed. Magnet 54 is provided for this purpose. The circuit for this magnet is shown in Fig. 2B as extending through a special section of the receiving distributor and the back contact of slow release relay 53 the winding of which is included in the line 24. The release time constant of this relay is such that normal selecting pulses coming in over the line 24 maintain the relay 53 operated so that relay 54 is continuously released. When the talker or radio station attendant opens key 32 for a time corresponding to several selecting pulses, relay 53 releases its armature and causes relay 54 to become energized during the sixth commutator interval. Relay 54 pulls down the bail 61 of Fig. 3 and releases the actuated bar 58. This action closes the previously open contact 55 and allows the selecting magnet 75 to be actuated to tune the transmitter and receiver to a new frequency under control of the search receiver. As soon as the selecting pulses begin coming in again over line 24, the energizing circuit for magnet 54 is held open at the back contact of relay 53 and selection of the next channel is permitted. Accordingly relay 53 is very fast to operate although slow to release.

In the operation of the system, first assuming the keys 31 and 32 closed and the switch 66 of each selective mechanism in its normal right-hand position in Fig. 3, each search receiver 21 and 22 is operating to scan the frequency band by successively tuning itself to each channel frequency. It will be understood that the search receivers act independently of one another in this scanning operation and that a shift can be made from one east-west channel to another quite independently of a shift in the corresponding west-east channel carrying the opposite side of the same two-way conversation. It is only necessary therefore to consider the operation of one of the search receivers, say 22.

The speech waves assumed to be in process of transmission from line 10 to line 11 continue on one channel until it is determined that a shift is to be made to a different channel. The determination can be made entirely automatically or mainly by the operator attendant or talker with the assistance of the automatically operating equipment. Considering first the former, the transmission may be taking place over channel No. 1 and the search receiver 22 in scanning the channels may find channels 2 and 3 either busy with other speech transmissions or occupied with radio energy representing interference of some sort. In passing over channels 2 and 3, the receiver 22 sends out channel identifying information in code in the first four impulse intervals. In response to this information, the channel selectors in the AFC at 26 and in the AFC at 25 each select the corresponding bar 40 and when the magnet 76 operates, the selected bar is pushed forward but no operation of the corresponding push-rod 58 takes place since the shift magnet 85 is not at this time operated, there being no marking impulse on line 24 in the fifth code interval since channels 2 and 3 are assumed to be receiving energy which holds the codan relay 70 (Fig. 2A) operated. This prevents connection of battery over the rest contact of relay 70 to ground, the other end of the battery being connected to the fifth segment of the upper ring of distributor 91 which is associated with line 24 during the fifth signal element.

The selector returns to normal after each operation of its magnet 76 in the manner explained in the Krum patent, and is made ready for a new selection.

If it is assumed that channel No. 4 is free of radio frequency energy and available for use as indicated by an unenergized condition of relay 70 in the fifth code interval, then in addition to the selection of channel No. 4 in the AFC's at 25 and 26, actuation of the selected push rod 58 will also occur with consequent shift of tuning of both oscillators 25′ and 26′ to transfer transmission to the new frequency. If no alternative available channel is found, transmission will continue on the original frequency assignment.

If the talker desires not to have a shift made to another channel until the channel in use becomes unsatisfactory, the switch 66 (Fig. 3) is thrown to the left in the figure. When any one of the sixteen contacts 55 is opened either as a result of a previously made channel appropriation or of a subsequently made appropriation, no further actuation of selector magnets 75 is possible until such open contact 55 is again closed. During this period the search receiver operates as before described to scan channels and send out channel identifying pulses and shift-actuating pulses but these are without any other effect than to hold relay 53 continuously energized, thus preventing operation of unlocking magnet 54. If the quality of transmission deteriorates to the point where the talker wishes to try another channel, he or the attendant opens key 32 for a sufficient time to permit magnet 54 in each AFC at 26 and 25 to energize as a result of closure of its energizing circuit through the back contact of relay 53 when the brush on the upper ring of distributor 92 passes over the No. 6 segment of the distributor. The actuated rod 58 is unlatched and returns to normal. After a time sufficient to allow this action to take place, key 32 is again closed. If key 32 is closed during commutator intervals 1 to 5, magnet 29′ will continue to hold armature 32′ in its uppermost position, thus preventing reclosure of line 24 until the sixth commutator interval. Magnet 29′ receives battery from first five segments of the lower ring of commutator 91 and exerts sufficient pull on armature 32′ in its upper position to prevent magnet 29 from actuating the armature to its lower position. (A retractile spring, not shown, holds armature 32′ in its upper position when magnet 29 is without current.) When the brush passes beyond commutator segment 5, the energizing circuit for magnet 29′ is broken and armature 32′ recloses line 24 due to the attraction of magnet 29. When armature 32′ is in its lowermost position due to closure of key 32, holding magnet 29′ together with the retractile spring is not strong enough to pull the armature away from its lower contact.

In the next traverse of the distributor brushes in the search receiver and in the AFC's at 26 and 25, operation proceeds as previously described until an available channel is found and seized for use whereupon the corresponding contacts 55 are opened and further selection and shift are prevented until key 32 is again opened for a sufficient interval and reclosed.

The distributors indicated at the different locations will need to be operated in synchronism with one another. Any known or suitable means for doing this may be used. Suitable synchronizing methods are common in the printing telegraph art and in general depend upon transmission of pulses over the line (e. g. line 24) either at special time or of special character, to make corrective adjustments in speed or phase position of the brush arms.

Fig. 4 shows a simple type of lock-out that may be used in a system of more than two terminals. The apparatus at each of the three terminals shown as stations A, B and C is the same as already described and operates in the same way. It is assumed that the three search receivers 21, 22 and 22′ operate in unison. To insure this a source of synchronizing currents is indicated at 83 for sending to each of the search receivers a succession of pulses to time their operation. Any known and suitable scheme of synchronizing may be used such as those commonly employed in the printing telegraph art for synchronizing the operation of distributors at separated stations.

The search receiver 21 at station A acts as previously described to control the timing of its own receiver and the tuning of the transmitters 20 and 20′ of the other stations, although 20′ may be connected to be controlled instead from some other station (not shown) if station C is in communication therewith. Without the provision of the lock-out feature it would be possible to tune the station A transmitter 17 to a given frequency if search receiver 22 found this frequency unused. This could cause interference with intelligence being received by 19′ at station C from some fourth station (not shown) operating on this frequency which, however, might be too weak to affect search receiver 22.

To prevent such interference, the control output line from search receivers 22 and 22′ are brought respectively to the windings of relays 80 and 81 at the control center. The front contacts of these relays are connected in series with each other in a bridging branch from line *b* to battery and ground.

In operation, since both receivers 22 and 22′ run in synchronism and utilize duplicate code tapes, they will send duplicate pulses during each code pulse interval for the first four intervals, that is, during the code selecting part of the cycle. Relays 80 and 81 will operate in like manner to apply marks and spaces to line *b* to cause similar channel identifications to be made at 17, 19 and 19′. In the fifth code interval if there is disagreement between the search receivers 22 and 22′ as to presence or absence of radio frequency energy in the channel being tested, one or the other of relays 80, 81 will be unenergized at this time and no selection of the channel in question will be made. Only if both receivers 22 and 22′ find a channel available, will both relays 80 and 81 be energized in the 5th code interval and will selection of such channel be made.

Delay 82 is representative of any delays that may be found necessary in any of the control lines of the system to compensate for unequal transmission times over the different lines. Some delay may be needed in other situations represented in circuit figures, as for instance in the relatively short connection from a search receiver to the receiver of its own station. It will be obvious to supply such delays wherever needed.

Fig. 5 shows a more extensive type of lock-out. The same general plan is used as described above except that the system has four terminals. Communication goes on between stations A and B independently of communication between stations C and D. It is desired to protect the radio receiver of each station from interference due to transmitters from which it is not supposed to be receiving as well as from any other disturbances existing in the air. The distances between stations are assumed to be great. The control station may be anywhere as, for example, at a central location. It is connected to each of the other stations by four one-way transmission paths shown as solid lines. A source of synchronizing currents 83′ sends to each of the search receivers R′ a succession of pulses to time their operation. Each of these search receivers uses the same punched tape code so that identical signals during the first four signal elements of each character are delivered simultaneously by each to a separate receiving relay in the control station viz: relays 100, 101, 102 and 103 for stations A, B, C, D, respectively. The contacts of the relays are wired to give the following effects:

1. The transmitter of station A and receiver of station B are controlled by relays 101, 102, and 103, contacts 107, 110 and 112.
2. The transmitter of station B and receiver of station A are controlled by relays 100, 102 and 103, contacts 104, 110 and 112.
3. The transmitter of station C and receiver of station D are controlled by relays 100, 101, and 103, contacts 105, 108 and 112.
4. The transmitter of station D and receiver of station C are controlled by relays 100, 101 and 102, contacts 106, 109 and 111.

In each the four cases listed directly above, the transmitter and receiver mentioned are tuned to an idle frequency band when the three relays mentioned are all operated and their contacts closed during the fifth signal element which follows the four band selecting signal elements. The method of tuning is the same as previously described in connection with Figs. 1 to 3 inclusive.

Delay networks not shown in Fig. 5 should be included whenever necessary in the trunks between radio stations and control center.

When more than four stations exist, as in a world-wide system, it is possible to use the same principle to provide lockout between as many of them as one desires so that suitable bands are selected for certain transmitters which will not overlap bands already in use. Thus weak signals which are being received at one station and which fail to operate the codan relay 70 at another station are nevertheless utilized to prevent trouble from any transmitter near enough to produce interference with these weak signals.

With Figs. 4 and 5, or with a greater number of stations, protection of this sort may be obtained while having all the keys 31 and 32 closed and all switches 66 to the right at all stations, or while having all switches 66 to the left and keys 31 or 32 operated whenever one finds transmission is jammed.

What is claimed is:

1. In a radio telephone system, a plurality of radio telephone transmitters, a corresponding plurality of distant radio telephone receivers, each such transmitter and receiver being capable of tuning to any one of a group of radio frequencies used in common by said transmitters and receivers for speech transmission, a search receiver associated with each of said receivers for continually scanning the frequency band embraced by said frequencies to determine which portions of the band are carrying energy of said respective frequencies, means under control of said search receivers for effecting a re-tuning of said associated receiver and of the distant radio telephone transmitter from which it is receiving, so as to utilize a different one of said radio frequencies for transmission and reception of speech, and means making such re-tuning dependent upon the absence of a significant level of radio energy of the frequency corresponding to such different one of said radio frequencies.

2. In radio telephony, a plurality of radio telephone channels traversing a geographical region, each comprising a radio transmitter and a distant cooperating radio receiver, each transmitter and receiver being capable of tuning to any one of a plurality of radio frequencies within a common range, channel scanning means for progressively testing each channel to determine whether or not radio energy is present in the frequency band corresponding to such channel, means to carry speech transmission over a given channel and to continue the use of such channel for such transmission until a shift is made in the tuning of the transmitter and receiver thereof to the frequency band of a different channel, means under control of said channel scanning means for effecting such shift after said different channel is located, and means making such shift dependent upon absence of radio energy of significant amount in the frequency band corresponding to said different channel.

3. A system according to claim 2 in which said channel scanning means comprises a search receiver for each of said radio receivers, means for automatically tuning said search receivers to each channel frequency within said range in rotation and means to transmit channel-identifying information to a distant transmitter with which a given respective radio receiver is cooperating, identifying the channels as they are being scanned.

4. A system according to claim 3 including means in association with said search receivers for transmitting in addition to said channel-identifying information further information as to whether or not each channel scanned is carrying radio energy.

5. In a multichannel radio system subject to severe interference a transmitter, a communication receiver at a location different from said transmitter, a search receiver, means for automatically tuning said search receiver to enable it to receive waves in each channel of the system in succession, means controlled by said search receiver to transmit a channel-identifying signal to both the said transmitter and the said communication receiver of said system to identify thereat the channel to which said search receiver is at the moment tuned, means controlled by said search receiver for sending a switching signal to said transmitter and communication receiver dependent upon the condition that the identified channel is idle and suitably free of interference, and means controlled by said switching signal for shifting the tuning of said transmitter and said communication receiver to utilize the identified channel.

6. A system according to claim 5 including means for automatically locking the shifting means to prevent shift to another channel, and means at the transmitter to un lock the shifting means to permit a further shift to be made.

7. A system according to claim 5 in which search receivers are used at a plurality of receiving points of the system, means controlled from a single or centrally located point of the system for synchronizing the action of said search receivers, and an interlocking control circuit for the transmitter tuning shifting means, said interlocking control circuit being under the joint control of a plurality of said search receivers.

8. In a radio telephone system, a plurality of radio channels between one geographical location and another, means for scanning the ether band used by said channels to locate other channels significantly free of radio energy, means operative during transmission over a given channel to shift the transmission to another one of said channels, and means for initiating said shift under control of said scanning means upon the condition that said scanning means locates another one of said channels not already carrying radio energy.

References Cited in the file of this patent

UNITED STATES PATENTS

| Number | Name | Date |
|---|---|---|
| 2,137,023 | Monk | Nov. 15, 1938 |
| 2,231,806 | Goldsborough | Feb. 11, 1941 |
| 2,363,583 | Gilman | Nov. 28, 1944 |
| 2,384,456 | Davey | Sept. 11, 1945 |
| 2,479,701 | Ress | Aug. 23, 1949 |
| 2,521,696 | De Armond | Sept. 12, 1950 |
| 2,525,679 | Hurvitz | Oct. 10, 1950 |